United States Patent [19]

Killpatrick et al.

[11] Patent Number: 5,663,792
[45] Date of Patent: Sep. 2, 1997

[54] TRANSVERSE MODE SELECTED OPERATION FOR A RING LASER

[76] Inventors: Joseph E. Killpatrick, 2901 32nd Ave. Northeast, Minneapolis, Minn. 55418; Theodore W. Broberg, 1508 23rd Ave. Northwest, New Brighton, Minn. 55112; Timothy J. Callaghan, 3062 Shorewood La., Roseville, Minn. 55113; Leroy O. Thielman, 4275 Hodgson Rd.; Rodney H. Thorland, 5723 Pond Dr., both of Shoreview, Minn. 55126

[21] Appl. No.: 598,773

[22] Filed: Feb. 9, 1996

[51] Int. Cl.$^6$ ................................................ G01C 19/66
[52] U.S. Cl. ................................................ 356/350; 372/19
[58] Field of Search ................................ 356/350; 372/19

[56] References Cited

U.S. PATENT DOCUMENTS

| | | |
|---|---|---|
| 3,286,193 | 11/1966 | Koester et al. . |
| 3,404,349 | 10/1968 | Rigrod .................. 372/19 |
| 3,581,227 | 5/1971 | Podgorski .............. 356/350 |
| 3,879,130 | 4/1975 | Greenstein ............. 356/350 |
| 4,152,071 | 5/1979 | Podgorski .............. 356/350 |
| 4,219,254 | 8/1980 | Macken . |
| 4,383,763 | 5/1983 | Hutchings et al. ...... 356/350 |
| 4,488,080 | 12/1984 | Baumann .............. 310/328 |
| 4,514,832 | 4/1985 | Vescial ................. 356/350 |
| 4,519,708 | 5/1985 | Perlmutter et al. ..... 356/350 |
| 4,522,496 | 6/1985 | Sanders ................ 356/350 |
| 4,627,732 | 12/1986 | Braun et al. .......... 356/350 |
| 4,677,641 | 6/1987 | Podgorski ............. 372/108 |
| 4,691,323 | 9/1987 | Ljung et al. .......... 372/107 |
| 4,783,169 | 11/1988 | Matthews et al. ..... 356/350 |
| 5,420,683 | 5/1995 | Hall .................. 356/350 |
| 5,420,685 | 5/1995 | Podgorski ............ 356/350 |

OTHER PUBLICATIONS

Bela A. Lengyel's "Introduction to Laser Physics" John Wiley and Sones, Inc., N.Y., 1996.

Publication entitled "Quantum Electronics" by Amnon Yariv, John Wiley and Sons, Inc., New York, London, Sydney, Toronto, copyright 1967, 1975, on p. 119.

Publication entitled "Resonant Modes in a Maser Interferometer" by A.G. Fox, et al., from the Bell System Technical Journal, Mar. 1961, pp. 453–488.

*Primary Examiner*—Vincent P. McGraw
*Attorney, Agent, or Firm*—Thomas A. Rendos

[57] ABSTRACT

Apparatus for improving the bias stability of a ring laser gyro by selecting a secondary transverse mode and controlling the path length of the gyro to maintain the selected mode.

10 Claims, 3 Drawing Sheets

$TEM_{00}$ $TEM_{10}$ $TEM_{20}$ $TEM_{30}$

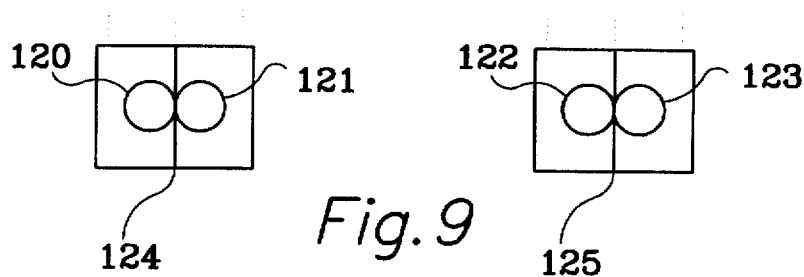
Fig. 9
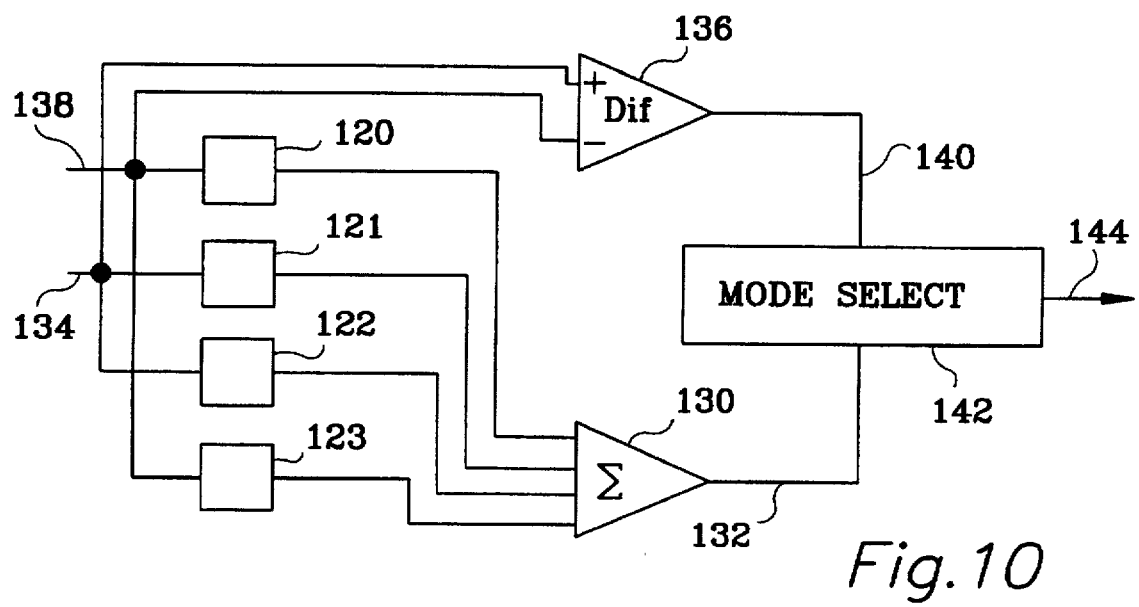
Fig. 10
Fig. 11
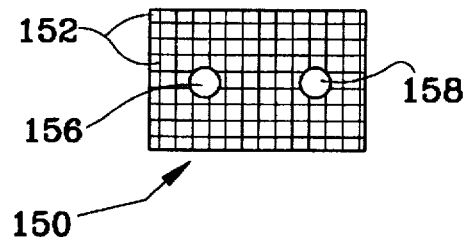

TRANSVERSE MODE SELECTED OPERATION FOR A RING LASER

BACKGROUND OF THE INVENTION

1. Field of the Invention

This invention generally relates to ring lasers, and more specifically ring laser angular rate sensors. Yet more specifically, the invention relates to the selection of the transverse mode of the counter-propagating laser beams which propagate along the optical closed loop path of the ring laser in order to selectively diminish the inherent bias stability associated with the ring laser angular rate sensor performance.

2. Description of the Related Art

Ring laser angular rate sensors or ring laser gyros of the type manufactured by Honeywell, Inc., of Minneapolis, Minn. are well known. As its name implies, a ring laser gyro is an angular rate sensor which utilizes a laser beam traveling in a closed loop optical path. More particularly the Honeywell ring laser gyro is an angular rate sensor which utilizes a pair of laser beams which are directed by a plurality of reflectors or mirrors to travel in opposite directions along a closed loop optical path within a ring laser block and to detect rotation about an axis passing through the polygonal path circumscribed by the laser beam by detecting differences in the travel characteristics of the two beams.

One type of polygonal closed path employed for ring laser angular rate sensors is triangular, and in which one mirror is positioned or located at each corner of the triangular path. Other types of ring laser rate sensors or gyros having other polygonal shaped optical closed loop paths, such as four sided ring laser gyros, are also known, and they operate according to the same principles.

As is also well known, in order to properly operate a ring laser gyro, the ring laser gyro requires that the closed loop polygonal optical path be maintained at a substantially constant length. This is important since the laser beam intensity is dependent upon the closed loop polygonal optical path, hereinafter referred to as the optical path length. Variations in the beam intensity can adversely affect the performance parameters of the gyro and such variations can cause gyro errors. In order to maintain a constant optical path length, a mirror transducer is commonly employed in which one of the mirrors in the closed loop optical path includes a mechanical transducing means for adjusting its position relative to the other mirrors which also define the optical closed loop path.

Such mirror transducers compensate the ring laser gyro for thermal expansion effects which are inherent in the structure, and which may cause undesirable optical path length variations.

The operation of a ring laser gyro with employment of a path length control mirror transducer is well known. Mirror transducers for path length control in ring laser gyros have generally been fabricated by use of a piezo electric element driven transducer assembly. Examples of path length control mirrored transducers used in ring laser gyro applications include those illustrated in U.S. Pat. No. 3,581,227 and U.S. Pat. No. 5,420,685, both of which were issued to Podgorski, U.S. Pat. No. 4,383,763 issued to Hutchings, et at., U.S. Pat. No. 4,488,080 issued to Baumann, and U.S. Pat. No. 4,691,323 issued to Ljung, et al.

Path length control systems are also shown and described in U.S. Pat. No. 4,152,071, issued to Podgorski, and U.S. Pat. No. 4,522,496 issued to Sanders. Each of these patents show in further detail the employment of a partially transmissive mirror for permitting a portion of the laser beam to exit and impinge upon a photodetector. In turn, the photodetector provides an output signal representative of the intensity of the beam impinging thereupon. A control scheme employing generally a synchronous demodulator and integrator provides a drive signal to the path length control mirror transducer for adjusting the laser path length to obtain a peak laser beam intensity. As is well understood in the art, the closed loop optical path length traveled by the laser beams may be adjusted by more than one mirror. For example, a pair of mirrors, either in the triangular optical closed loop path or the rectangular optical closed loop path scenario.

Optical arrangements for obtaining a single beam signal representative of the intensity of the individual beams or a double beam signal to determine an output which is proportional to the frequency difference of the counter-traveling laser beams and thus to the angular rotation are known. U.S. Pat. No. 4,677,641 describes an optical readout arrangement for obtaining both the single beam signals and the double beam signals and U.S. Pat. No. 4,514,832 describes the detector structure for use in the ring laser gyro, also for obtaining information representative of the single beam signals and the double beam signals.

Ring laser gyros of the prior art, including the path length control transducers as aforementioned, have been generally constructed such that the pair of laser beams are established and propagate in only the fundamental transverse electromagnetic wave mode identified as $TEM_{00}$.

One technique used by the prior art for only permitting the existence of the $TEM_{00}$ laser beam mode is by restricting the laser beams by passing them through a limited aperture or tunnel thereby preventing the existence of other transverse modes.

It is recognized by those skilled in the art that $TEM_{00}$ modes are to be distinguished from other transverse modes. For example, in the aforementioned U.S. Pat. No. 4,522,496, a ring laser gyro is described in which there exists several transverse modes for the same co-existing laser beams.

Further, other mode controls regarding lasers and masers have been described in U.S. Pat. No. 3,286,193 issued to Koester et at. and U.S. Pat. No. 4,219,254 issued to Macken. Macken describes a technique for controlling the type of transverse electromagnetic modes in a laser by employment of an optical device having an arrangement and type of coatings thereon. A mode control is also illustrated in U.S. Pat. Nos. 4,519,708 issued to Perlmutter, et al. and 4,627,732 issued to Braun, et al. The latter two patents addressing ring laser gyro operation for a four frequency gyro including techniques for operating the gyro with particular left and right circular polarized waves in a specific manner to avoid the frequency locking or locking problem as is well understood with regard to two frequency laser gyroscopes.

In general, discussion of laser modes can also be found in publications relating to lasers. For example, reference is made to Bela A. Lengyel's "Introduction to Laser Physics" John Wiley and Sons, Inc., N.Y, and a publication entitled "Quantum Electronics", by Amnon Yariv, John Wiley and Sons, Inc., New York, London, Sydney, Toronto, copyright 1967, 1975, on page 119, figures and including particularly FIG. 6.7 showing various transverse electromagnetic wave modes. Another publication is entitled "Resonant Modes in a Maser Interferometer" by A. G. Fox, et al., found in the Bell System Technical Journal, March 1961.

U.S. Pat. No. 3,879,130 issued to Greenstein illustrates another example of a ring laser being operated with the counter-propagating laser beams being of two different longitudinal modes, i.e., different frequency.

One attribute of a ring laser gyro for judging performance is bias stability. As is well understood, if bias in a ring laser gyro is stable it may be compensated. On the other hand, if the bias is unstable, then it may only be compensated to a limited extent, and the remainder results in long-term and unknown error. Since the bias stability is a function of the arrangement of all of the assembly of the ring laser gyro, including all its constituent components, it may not be predicted except for extreme values. Therefore, ring laser gyros are commonly subjected to extensive performance tests so as to ascertain the bias stability characteristics of the completed gyro before being placed in service in a navigation or control device.

In turn, if the bias stability is unacceptable, the ring laser gyro will be disassembled and parts may be salvaged in order to produce another gyro for being reassembled and performance testing. Of course, such procedures directly contribute to the total cost of the ring laser gyro.

As stated above, although other modes have been recognized as existing, all attempts have been made in previous laser gyros to restrict their operation to the $TEM_{00}$ mode.

SUMMARY OF THE INVENTION

An object of the present invention is to provide a ring laser gyro having a greater probability of satisfying bias stability performance criteria. In the present invention, a ring laser gyro is provided which establishes first and second laser beams to counter-propagate along a "closed loop" polygonal optical path, and in which the first and second laser beams are capable of propagating in at least a $TEM_{00}$ transverse mode and a secondary transverse mode referred to as $TEM_{10}$. The ring laser gyro further comprises a path length control means for maintaining a closed loop polygonal optical path at a length such that the second transverse mode or $TEM_{10}$ is maintained substantially at a maximum, while at the same time diminishing the $TEM_{00}$ mode.

In order to establish and maintain the laser in the $TEM_{10}$ mode, the gyro cavity length is altered to the desired path length. We have observed that, while in the $TEM_{00}$ mode, a single spot of light impinges on the detector, in the $TEM_{10}$ mode, two side-by-side spots of light appear. Accordingly, in one embodiment, we provide an opaque mask with two transparent apertures therein positioned to allow the passage of the two spots of light while blocking the rest to the maximum extent possible. As the cavity length is altered, the intensity of light reaching the detectors will maximize when the $TEM_{10}$ mode is reached.

In an alternate embodiment of the present invention the photodetector means itself may comprise of a plurality of small discreet photosensing elements positioned to receive the two spots of light so as to only respond to the $TEM_{10}$ mode.

Still further, in accordance with the present invention a control circuit may be employed for selectively determining which transverse electromagnetic wave mode will be detected and controlled in accordance with selective criteria.

BRIEF DESCRIPTION OF THE DRAWINGS

FIG. 1 is a schematic diagram depicting a ring laser gyro.

FIGS. 2a–5a are graphs illustrating four possible transverse electromagnetic modes for the counter-propagating laser beams of the ring laser FIG. 1;

FIG. 2b–5b illustrate the appearance of the various modes of FIGS. 2a–5a as they appear at the LIM detector of FIG. 1;

FIG. 9 shows a pair of split detectors for use with the mask of FIG. 8a;

FIG. 10 is a schematic diagram of a control circuit for use in selecting a desired mode; and, FIG. 11 shows a detector array for use in the present invention.

DESCRIPTION OF THE PREFERRED EMBODIMENT

Figures 1, 2A, 2B, 3A, 3B, 4A, 4B, 5A, 5B:
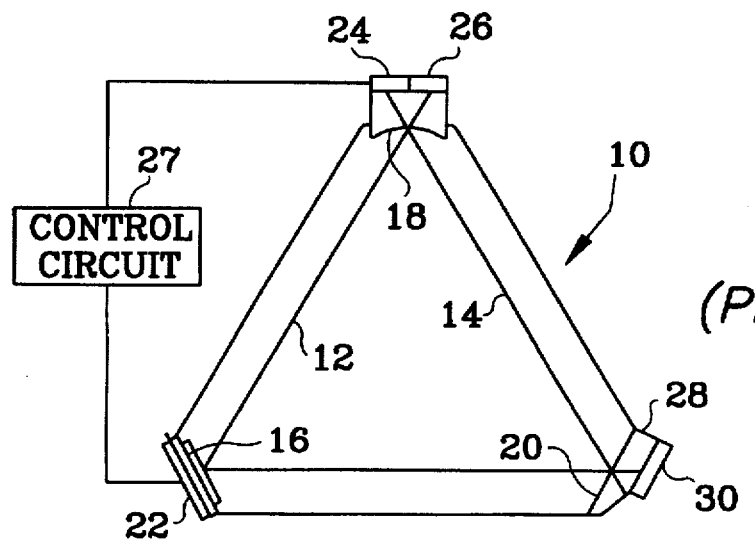

FIG. 1 is a schematic block diagram depicting a ring laser gyro 10 having a triangular configuration as is well known in the art. Laser beams 12 and 14 are established to counter propagate in the gyro 10 around a close loop path by reflection from mirrors 16, 18 and 20. Mirror 16 along with a path length control driver 22 acts together to change the cavity length of the laser gyro. Mirror 18 is a curved, partly reflective mirror which has a pair of detectors 24 and 26 mounted thereon to receive the counter rotating beams 12 and 14 to determine their intensity. The signals detected by detectors 24 and 26 are added to remove the SBS signal which acts as a noise source to the PLC circuit. Mirror 18 and detectors 24 and 26 are part of a laser intensity monitor (LIM) package which is used in conjunction with a control circuit 27, connected between the detectors 24 and 26 and the control driver 22 to control the path length in the laser as is known in the art. Partially transmissive mirror 20 is attached to a prism 28 so that the counter propagating beams 12 and 14 emerge from the laser cavity to be combined by reflections within the prism and then directed to a readout detector 30 on the prism 28.

In the prior art, gyros such as shown in FIG. 1 have been intentionally constrained to operate in the fundamental $TEM_{00}$ mode either by use of a mask having a single aperture therethrough placed on the surface of detectors 24 and 26 or through the use of an intercavity aperture. In this art, only the fundamental mode, which produces a single spot at the aperture is able to reach the detector. When the detectors show that a maximum intensity is reached, the path length is known to be proper for the $TEM_{00}$ mode.

FIG. 2a shows the curve 40 representing the fundamental $TEM_{00}$ mode and FIG. 2b shows the appearance of the beams at the detectors 24 and 26 as a single spot 42 of light.

Other modes may exist in the gyro 10 and can be produced by changing the path length with the device 22 of FIG. 1. FIG. 3a shows a curve 50 representing the above referred to secondary mode $TEM_{10}$ and FIG. 3b shows the appearance of the beams at detectors 24 and 26 as a double spot of light 52a and 52b. Similarly, FIG. 4a shows curve 60 representing a third mode referred to as $TEM_{20}$ and FIG. 4b shows the appearance of the beams at the detectors 24 and 26 as a triple spot of light 62a, 62b and 62c. FIG. 5a shows curve 70 representing a fourth mode referred to as $TEM_{30}$ and FIG. 5b shows the appearance of the beams at the detectors 24 and 26 as a quadruple spot of light 72a, 72b, 72c, and 72d. Other modes such as $TEM_{01}$, $TEM_{11}$, $TEM_{02}$ etc. exist but the four shown are believed sufficient to explain the present invention.

Figure 6:
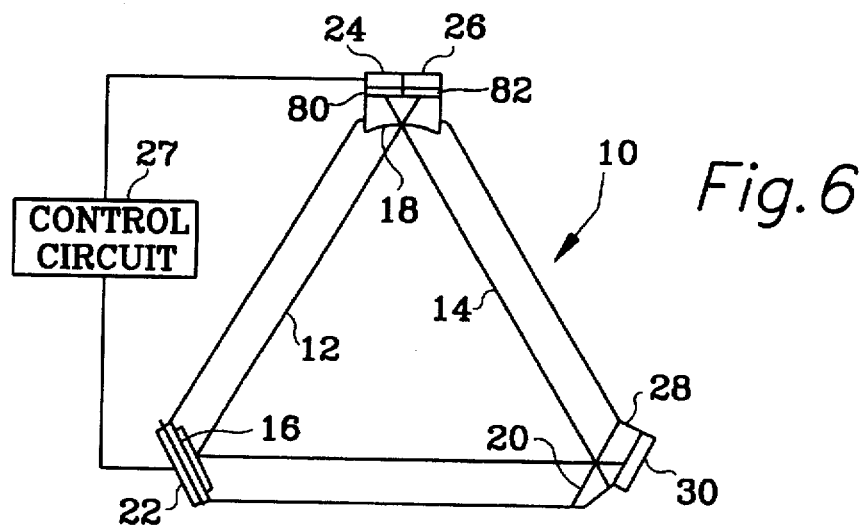
FIG. 6 is a schematic diagram, similar to FIG. 1, depicting the ring laser gyro of the present invention.
Figure 7A:
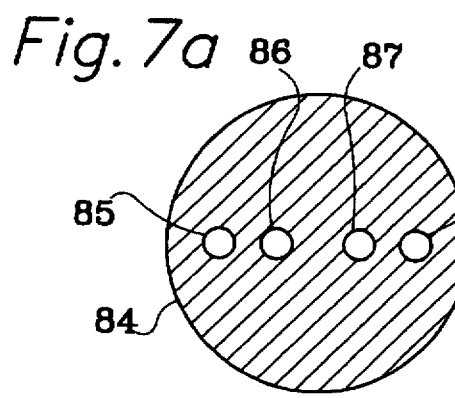
FIGS. 7a and 7b illustrate a mask, shown in FIG. 7a, for isolating the $TEM_{10}$ mode shown in FIG. 7b.
Figure 7B:
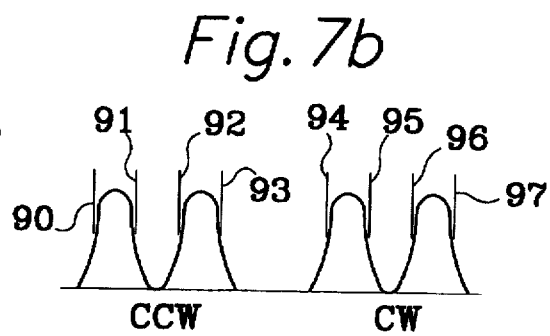

FIG. 6 shows the laser gyro of FIG. 1 except that masks 80 and 82 are shown between mirror 18 and the detectors 24 and 26 respectively. Mask 80 is for the counter clockwise propagating beam while mask 82 is for the clockwise propagating beam. Masks 80 and 82 may be two separate masks, each having two apertures therethrough or may comprise a single mask with four apertures as may be better seen in FIG. 7a. In FIG. 7a, an opaque member 84, which is shown of substantially circular crossection but which may have any desired shape, is seen with four apertures, two for each beam direction and spaced so that when peak signals for the $TEM_{10}$ mode occur, they will pass through the apertures to the detector therebehind. This is better seen in FIG. 7b which show two graphs like FIG. 3a side by side on a common abscissa. The left graph is for the counter clockwise beam and the right for the clockwise beam. Two pair of vertical lines 90–91 and 92–93 are spaced around the two peaks of the signal in the counter clockwise beam and two pair of vertical lines 94–95 and 96–97 are spaced around the two peaks of the signal in the clockwise beam. The vertical line pairs 90–97 define the areas of the signals where the maximum intensity occurs. In FIG. 7a, apertures 85 and 86 correspond to the peaks defined by vertical line pairs 90–91 and 92–93 respectively. Similarly, apertures 87 and 88 correspond to the peaks defined by the vertical line pairs 94–95 and 96–97. It is seen that when maximum light is received through the apertures 85–88 of FIG. 7a, the $TEM_{10}$ mode has been reached so that the control circuit 27 of FIG. 6 may stop the PLC 22 at the proper position to sustain the $TEM_{10}$ mode. If other modes such as $TEM_{20}$ or $TEM_{30}$ were desired, curves such as 4a and 5a could be similarly used to position the proper number of apertures in mask 84.

Mask 84 is used in the present invention, when it is known that the desired mode is $TEM_{10}$. However, it is often the case that the desired mode is not known in advance. Sometimes the $TEM_{00}$ mode works best (possibly when there is a differential loss source such as a particle near the edges of the cavity where the $TEM_{10}$ mode is used) and sometimes the $TEM_{10}$ mode work best (possibly because there is a differential loss source such as a particle in the center of the cavity where the $TEM_{00}$ mode is used). When it is observed that the mode being used is not the best, then it is desirable to adjust the cavity length of the gyro to find a better mode. This would require changing the masks 80 and 82 of FIG. 6 which is a time consuming task.

Figure 8A:
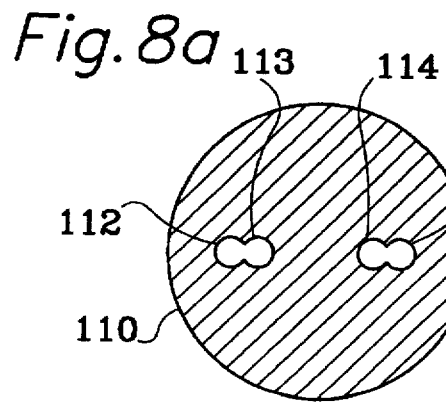
FIGS. 8a and 8b illustrate a mask, shown in FIG. 8a, for allowing a selection of either mode $TEM_{00}$ or mode $TEM_{10}$.
Figure 8B:
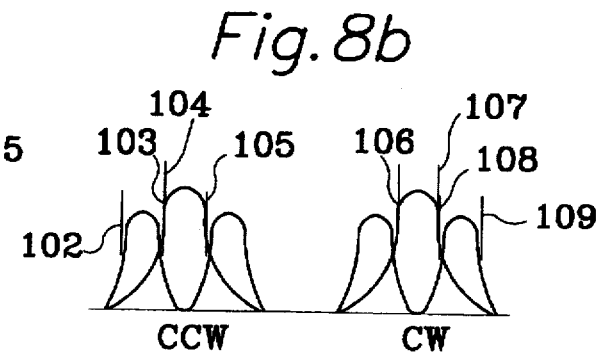

FIGS. 8a–10 show an alternate way of selecting a mode without having to change the mask. FIG. 8b shows a superimposition of two of the graphs of FIG. 2a with two of the graphs of FIG. 3a. The left hand graph of FIG. 8b represents the counter clockwise beam and the right hand graph represents the clockwise beam as in FIG. 7b. It is seen that the center peak of FIG. 8b, representing the $TEM_{00}$ mode lies in the center between the two peaks representing the $TEM_{10}$ mode. Vertical lines 102 and 103 define the left peak of the $TEM_{10}$ of the counter clockwise beam while vertical lines 104 and 105 define the peak of the $TEM_{00}$ mode for the counter clockwise beam. Similarly, vertical lines 106 and 107 define the peak of the $TEM_{00}$ mode for the clockwise beam while vertical lines 108 and 109 define the right hand peak of the $TEM_{10}$ mode for the clockwise beam. The right hand peak of the $TEM_{10}$ mode of the counter-clockwise beam and the left hand peak of the $TEM_{10}$ mode in the clockwise beam have been ignored since the operation will be satisfactory without them. In FIG. 8a, the mask 110 is shown opaque except for two pairs of apertures, 112–113 and 114–115, corresponding the positions of the peaks of FIG. 8b. As will be explained in connection with FIG. 10, as the cavity length changes, the $TEM_{00}$ peaks and the $TEM_{10}$ peaks will be presented to the mask 110. Behind each aperture pair, one of a pair of "split detectors" 120–121 and 122–123 seen in FIG. 9 is positioned so that a line 124 and 125 respectively centered between them is between the vertical lines 103 and 104 and between the vertical lines 107 and 108 of FIG. 8b respectively. It is seen that detectors 120 and 123, the outside detectors positioned behind apertures 112 and 115, will respond to the $TEM_{10}$ mode and the detectors 121 and 122, the center detectors positioned behind apertures 113 and 114 will respond to the $TEM_{00}$ mode. By properly analyzing the signals from detectors 120–123, the cavity length can be tuned to operate in either mode.

Referring to FIG. 10, the four detectors 120, 121, 122, and 123 from the two split detectors of FIG. 9 are shown as boxes identified with a "D". A first output from each detector is presented to a summing circuit 130 so as to produce an output on line 132 indicative of the sum of the energy sensed by the detectors. This output, which like the prior art, corrects for certain noise in the beams is used to enable the PLC control 27.

Second outputs from each of the inside detectors 121 and 122 are summed at junction point 134 and presented to the positive input of a differencing circuit 136. Similarly, second outputs from the outside detectors 120 and 123 are summed at a junction point 138 and presented to the negative input of the differencing circuit 136. The output of differencing circuit on a line 140 is indicative of the difference between the outputs of the two inside detectors 121 and 122 (those responsive to the $TEM_{00}$ mode) and the outputs of the two outside detectors 120 and 123 (those responsive to the $TEM_{10}$ mode). As such, if the output on line 140 is positive, then the $TEM_{00}$ mode is being sensed and if the output on line 140 is negative, then the $TEM_{10}$ is being sensed. Of course, the subtraction could be reversed to produce plus and minus outputs when the opposite modes were being sensed.

The signals on line 140 may be used to disable the PLC if the incorrect mode is being detected. In such a case, the PLC device 22 will continue changing path length on its normal scan until the output on line 140 is of the proper sign at which time the PLC is again enabled and the device 22 stops its scan at the proper path length. Accordingly, the lines 140 and 132 are shown in FIG. 10 connected to a mode select circuit 142 which produces an output on a line 144 which will be connected to the control circuit 27 of FIG. 6 to cause the desired operation. More particularly, if the gyro is sensing the $TEM_{00}$ mode but the $TEM_{10}$ mode is desired, PLC circuit 27 will be clamped and the length changing device 22 will continue scanning. Similarly, if the gyro is sensing the $TEM_{10}$ mode but the operator desires the $TEM_{00}$ mode, the PLC circuit 27 will be clamped and the device 22 will continue to scan. When the proper mode is reached, the mode select circuit will receive a signal of the proper sign and the device 22 will stop searching.

It is possible to provide the selection of the desired mode without the use of masks as is shown in FIG. 11. In FIG. 11, an array of detectors 150 is shown consisting of a plurality of small detectors, such as CCD's 152, arranged to receive the spots of light, shown in FIG. 2 as the two spots 156 and 158. With this arrangement, the outputs of the detectors can be analyzed to determine the intensity and where the spots of light impinge on the array and thus determine whether one, two or more spots of high or maximum intensity exist. Suitable receiving means such as a shift register (not shown) may be connected to receive the detector outputs and present them to a computer, not shown, so that the output magnitudes of the individual detectors can be determined and compared with a predetermined profile to establish the desired mode.

It is seen that we have provided a method and apparatus for controlling the operation of a laser gyro to enable the sustaining of modes other than the TEM$_{00}$ mode used in the prior art and by so doing we have been able to improve the bias stability of the gyro. Many changes and alterations will occur to those skilled in the art. For example, while the invention has been explained in connection primarily with the TEM$_{10}$ mode as an alternative to the TEM$_{00}$ mode, other modes may also be selected. Furthermore, while one control circuit has been shown for selecting a desired mode without changing masks, other control circuits will occur to those skilled in the art. It will also be appreciated that small detectors other than CCDs may be used to detect the positions of the spots of light and a pair of detector arrays or a large detector array used to detect the spots of light from both clockwise and counterclockwise beams. Accordingly, we do not wish to be limited to the specific disclosures used in explaining the preferred embodiments.

The embodiments of the invention in which an exclusive property or right is claimed are defined as follows:

1. In a ring laser gyro having a pair of counter propagating laser beams in a laser cavity and at least one detector having a surface to receive at least one of the counter propagating beams, said gyro being capable of sustaining at least one secondary transverse mode in addition to the fundamental transverse mode and wherein the fundamental transverse mode produces a light spot and wherein the secondary transverse mode produces at least a pair of light spots at the detector surface, the improvement comprising:

an opaque mask external to the laser cavity having plurality of translucent apertures and positioned to preferentially permit at least the pair of light spots to be transmitted therethrough to allow for selection of one of the modes; and path length control means connected to receive the output of the at least one detector and to control the path length of the gyro to sustain a transverse mode.

2. Apparatus according to claim 1 wherein the fundamental mode is the TEM$_{00}$ mode and the secondary transverse mode is the TEM$_{10}$ mode.

3. Apparatus according to claim 1 further including a second detector having a surface to receive the other of the counter propagating beams which produces a second pair of light spots on the surface of the second detector; and, a second opaque mask having a plurality of translucent apertures positioned to permit only the pair of light spots to be transmitted therethrough.

4. Apparatus according to claim 1 wherein the apertures in the mask are positioned to permit both the spot of light for the fundamental mode and the spots of light for the secondary mode to pass therethrough and wherein the detector includes a first portion responsive to the spot of light for the fundamental mode and a second portion responsive to at least one of the spots oil light from the secondary mode.

5. Apparatus according to claim 4 further including comparing means connected to the first and second portions of the detector to compare the outputs therefrom to determine which mode is being received.

6. Apparatus according to claim 3 wherein the apertures in both masks are positioned to permit both the spot of light for the fundamental mode and the spot of light for the secondary mode to pass therethrough and wherein both detectors include a first portion responsive to the spot of light for the fundamental mode and a second portion responsive to at least one of the two spots of light from the secondary mode.

7. Apparatus according to claim 6 further including comparing means connected to the first and second portions of both detectors to compare the outputs therefrom to determine which transverse mode is being received.

8. Apparatus according to claim 7 further including a summing circuit connected to the detectors and producing a first output indicative of the sum of the outputs of all of the detectors and the comparing means is a difference circuit for producing a second output indicative of the difference between the sum of the outputs of the detectors receiving at least one of the spots of light for the secondary transverse mode and the sum of the outputs of the detectors receiving the spot of light for the fundamental transverse mode.

9. Apparatus according to claim 8 further including mode selection means connected to receive the first and second outputs and to produce a resultant output to the path length control device to control the path length to the desired mode.

10. The method of improving the bias stability of a ring laser gyro having a detector and a pair of counter propagating laser beams in a laser cavity which can sustain the fundamental transverse mode which produces a single light spot at the detector and at least one secondary transverse mode which produces a pair of light spots at the detector, comprising the steps of:

A. Forming an opaque mask external to the laser cavity with two translucent portions positioned to preferentially permit at least the pair of light spots to be transmitted therethrough to allow for selection of one of the modes; and B. Positioning the mask of step A on the detector so that the detector receives transverse mode light and adjusting the path length of the ring laser gyro based on an output of the detector to sustain a selected transverse mode.

* * * * *